United States Patent [19]
Park

[11] Patent Number: 6,111,755
[45] Date of Patent: Aug. 29, 2000

[54] GRAPHIC AUDIO EQUALIZER FOR PERSONAL COMPUTER SYSTEM

[76] Inventor: Jae-Sung Park, #402, 368-27 Hapjung-dong, Mapo-ku, Seoul, Rep. of Korea

[21] Appl. No.: 09/038,729

[22] Filed: Mar. 10, 1998

[51] Int. Cl.[7] .............................. G01R 23/18; H04R 5/00
[52] U.S. Cl. ........................ 361/727; 361/725; 361/685; 381/109; 333/28 R
[58] Field of Search ................... 361/725, 727, 361/685; 381/109; 333/28 R; 334/85; 455/347, 348

[56] References Cited

U.S. PATENT DOCUMENTS

| | | | |
|---|---|---|---|
| 4,612,665 | 9/1986 | Inami et al. | 381/98 |
| 5,349,326 | 9/1994 | Yamada | 340/426 |
| 5,751,816 | 5/1998 | Howard | 381/24 |
| 5,761,033 | 6/1998 | Wilhelm | 361/686 |

*Primary Examiner*—Leo P. Picard
*Assistant Examiner*—Hung Van Duong
*Attorney, Agent, or Firm*—Jerry H. Noh

[57] ABSTRACT

A computer system having an enclosure, a motherboard in the enclosure, one or more disk drive bays in the enclosure each defining a bay opening in the front, a plurality of daughter card slots each having a slot opening in the back, a sound card mounted in one of the daughter card slots, and a graphic audio equalizer having an equalizer enclosure including an equalizer front panel sized and configured for mounting in one of the drive bays with the front panel in the bay opening. The equalizer further having manually operable controls, a first and second visual indicator means, a master volume control, a bracket mounted in another one of the card slots, a plurality of equalizer connectors including equalizer inputs and equalizer outputs on the bracket, and a cable operatively interconnecting the equalizer connectors to the audio equalizer. An electric circuit card carrying audio interface circuit means is supported only on the bracket, and an SRS audio system is placed in the equalizer housing for enhancing sound delivered to the equalizer outputs.

14 Claims, 4 Drawing Sheets

GRAPHIC AUDIO EQUALIZER FOR PERSONAL COMPUTER SYSTEM

BACKGROUND OF THE INVENTION

1. Field of the Invention

This invention relates generally to sound systems in multimedia personal computers and in particular is directed to a graphic audio equalizer with audio controls and graphic display mounted on a front panel for installation in a drive bay of the case of a personal computer system.

2. Background of the Invention

Personal computers or PCs are now common household and workplace appliances and have evolved into multimedia systems capable of processing digitally encoded sound files along with other data files, i.e. capable of both video and audio output. PCs are typically organized as a mother board, which is a large printed circuit board mounted in a case, a number of daughter cards each mounted in a slot connector of the mother board, one or more data storage drives each mounted in a drive bay of the case, and a common power supply also mounted in the case. The mother board carries the central processor, BIOS read-only memory, random access memory, and various peripheral integrated circuits which perform data input/output functions for the central processor. Various auxiliary systems are arranged on separate printed circuit boards which have a series of edge connectors along one edge of the circuit card, and the card is installed by inserting the card edge in a slot connector on the mother board of the PC. For example, the sound card converts digitally encoded audio to analog sound signals capable of driving the computers loudspeakers. Other cards frequently installed in slots on the mother board include video output systems and communications modems. Some daughter cards require inputs and outputs external to the computer system. These are normally provided as input or output connectors mounted on a metal bracket which is affixed to the rear edge of the card. When the card is installed in a slot connector on the mother board, this bracket aligns with and closes a rear slot opening in the computer case. The input/output connectors are on the side of the bracket facing the outside of the case and are accessible for making electrical connections with mating connectors on external cables of various types. This system organization provides much flexibility in the configuration and assembly of a PC because components can be chosen according to the needs, preferences and budget of each user.

The present direction in evolution of personal computers is towards complete audio-visual entertainment and information systems fully integrated with traditional computer data processing and data communications capability. For example, a CD-ROM drive may be used for installing software on a magnetic disk of the PC, for graphic display of reference materials including stored text and images on the video monitor of the PC, and for listening to music on conventional audio CDs (compact discs). Television and radio tuners are available on daughter cards which along with appropriate operating software permit viewing of television broadcasts on the computer monitor and listening to radio broadcasts through the PC's sound card and loudspeakers. In other words, the equipment which traditionally constituted the home entertainment center is being integrated with the personal computer. This trend in turn has created a need for PC audio handling capabilities which more closely approach the high quality sound reproduction of traditional separate audio component systems, in order to replace the rather utilitarian sound systems now commonly found in PCs.

One such audio component is the graphic equalizer, which divides the audio spectrum into narrow frequency bands, typically ten or twelve bands. On the front panel of the equalizer are provided a series of slide controls, each of which can be moved up or down from a neutral center position to raise or lower the sound level for a particular frequency band. When all of the slide controls are so adjusted their relative positions on the front panel of the equalizer provides a graphic display representative of the overall frequency response of the equalizer over the entire audio spectrum, typically from 20 Hz to 20 kHz.

Graphic equalizers are useful for tailoring or shaping the frequency response of an audio system to compensate for shortcomings in one or more of the components, for peculiarities in the listening environment, or simply to suit someone's personal listening preferences. For instance, the presence or absence of upholstery or draperies in a listening room can greatly affect the quality of sound reproduction, which can be balanced by appropriate adjustment of the equalizer controls. Sophisticated control over sound reproduction is possible, as when compensating for subtle resonances in a particular room which affect narrow sound frequency bands. Peaks and dips in a loudspeaker's frequency response can be similarly equalized to more closely approach an ideal flat frequency over the entire audio spectrum. The graphic equalizer allows the listener to overcome many limitations of an audio setup.

Audio equalizers available for use with personal computers generally have been of two types. One is in the form of a daughter card installed internally in the computer's case on a slot of the mother board and is controlled via software which provides a graphic display on the video monitor of the computer. The other known type is essentially a conventional stand-alone graphic equalizer which is connected to the outputs of the computer sound card with audio cables.

Neither approach is entirely satisfactory. The internal card mounted software controlled equalizers take up a slot on the mother board which may not be available or may be needed for other more important uses. Software control of the equalizer forces the computer operator to call up the software utility on the video screen whenever adjustment is desired, an inconvenience which may necessitate exiting another previously running software application. And while the equalizer display is off-screen, which is normally the case, the operator has no information of the equalizer's settings. The stand-alone equalizers, on the other hand, increase clutter in the form of yet another box with a power cord which has to plugged into an A.C. outlet and interconnecting cables between the equalizer and the PC.

A continuing need exists for an audio equalizer which overcomes the aforementioned shortcomings.

SUMMARY OF THE INVENTION

This invention addresses the aforementioned need by providing a graphic equalizer for a computer system having a computer case with a front, a back and a plurality of sides, a mother board mounted in the case, one or more disk drive bays in the case each defining a bay opening in the case front, a plurality of daughter card slots each having a slot opening in the case back, and a sound card mounted in one of the daughter card slots including a plurality of sound card connectors in a corresponding one of the slot openings. The graphic audio equalizer according to this invention has an equalizer enclosure including an equalizer front panel sized and configured for mounting in one of the drive bays with the front panel in the bay opening. The front panel of the equalizer has manually operable controls on the front panel for shaping a desired audio response over an audio bandwidth of the equalizer, a graphic display on the front panel for displaying the shaped audio response, a master volume control for manually adjusting the overall audio output level of the equalizer, and graphic displays for displaying the instantaneous audio level of each audio channel of the equalizer. The equalizer is preferably a stereo equalizer and includes two audio channels, the audio response of both being controllable by the front panel mounted controls and displayed on the front panel mounted graphic displays.

The equalizer also has a bracket mounted in another one of the slot openings, a plurality of equalizer connectors including equalizer inputs and equalizer outputs on the bracket, and a cable operatively interconnecting the equalizer connectors to the audio equalizer such that sound output from the sound card connectors may be connected to the equalizer inputs for deriving a shaped sound output at the equalizer outputs.

In a presently preferred embodiment the front panel of the equalizer has a headphone jack connected for cutting off sound output to the equalizer outputs upon insertion of a headphone plug into the jack, and a microphone jack connected through a front panel mounted microphone volume control to an equalizer microphone output to make available volume controlled microphone sound for a microphone input of the sound card.

The equalizer may also include an electronic circuit card supported only on the bracket and carrying an audio interface preamplifier circuit operative for amplifying low level audio input from the sound card to the equalizer input, and the cable may be a ribbon cable between the circuit card and the equalizer housing for supplying power to the card and carrying audio signals to audio circuits in the equalizer housing.

At this time it is preferred that the equalizer housing be dimensioned and configured to fit in a standard sized 5¼ inch hard drive bay in the computer case, and that the equalizer front panel be substantially 5⅞ inches by 1¹¹⁄₁₆ inches in dimension.

Desirably, the equalizer also includes an SRS audio system in the equalizer housing operative for enhancing sound delivered to the equalizer outputs and a manually actuatable on/off switch on the front panel connected for enabling or disabling the SRS audio system.

These and other improvements, features and advantages are more fully described and illustrated in the following detailed description of the preferred embodiments and the accompanying drawings.

DETAILED DESCRIPTION OF THE PREFERRED EMBODIMENTS

Figure 1:
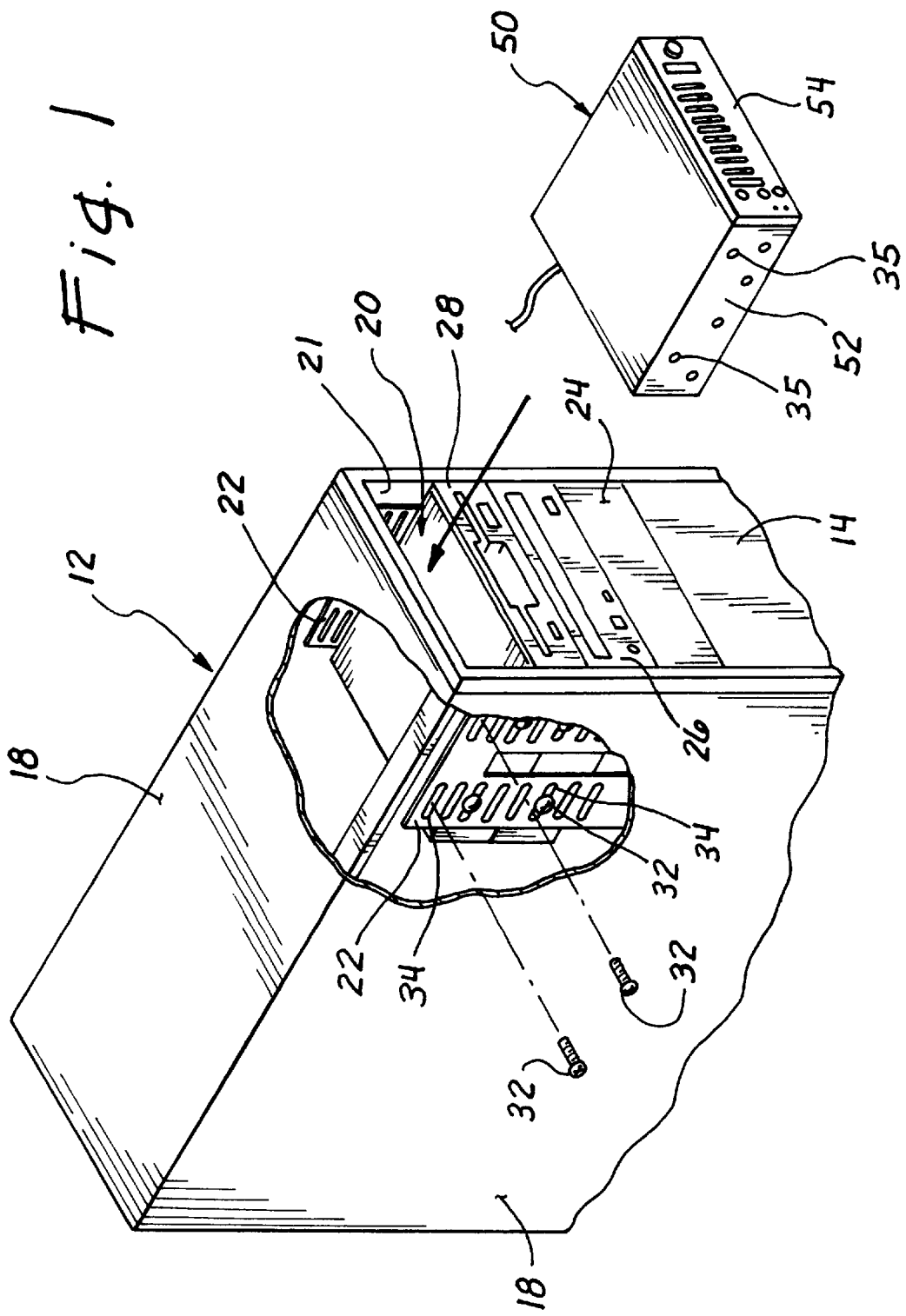
FIG. 1 is a fragmentary perspective view partially exploded view showing the drive bay installation of this invention in a typical personal computer case.
Figure 2:
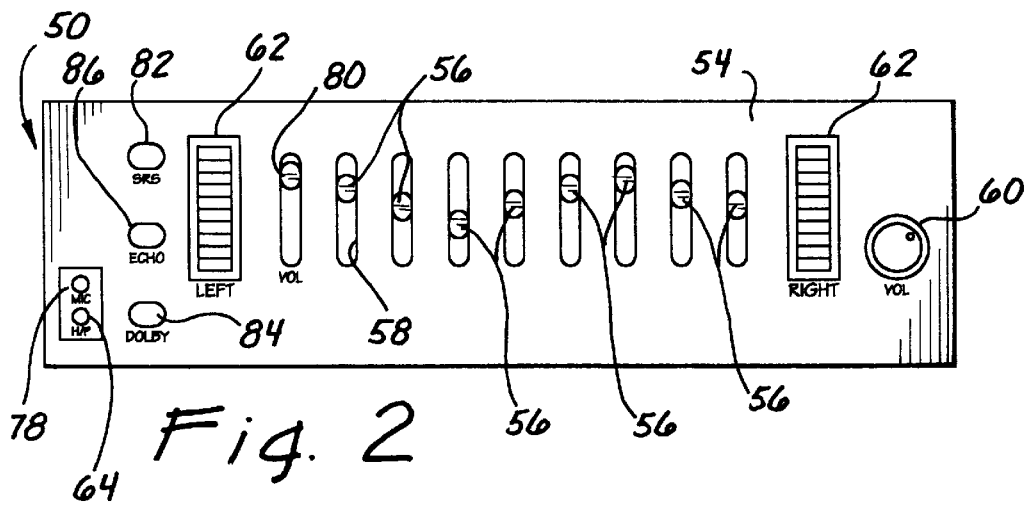
FIG. 2 is a front view of the front panel of the graphic audio equalizer of FIG. 1.
Figure 4:
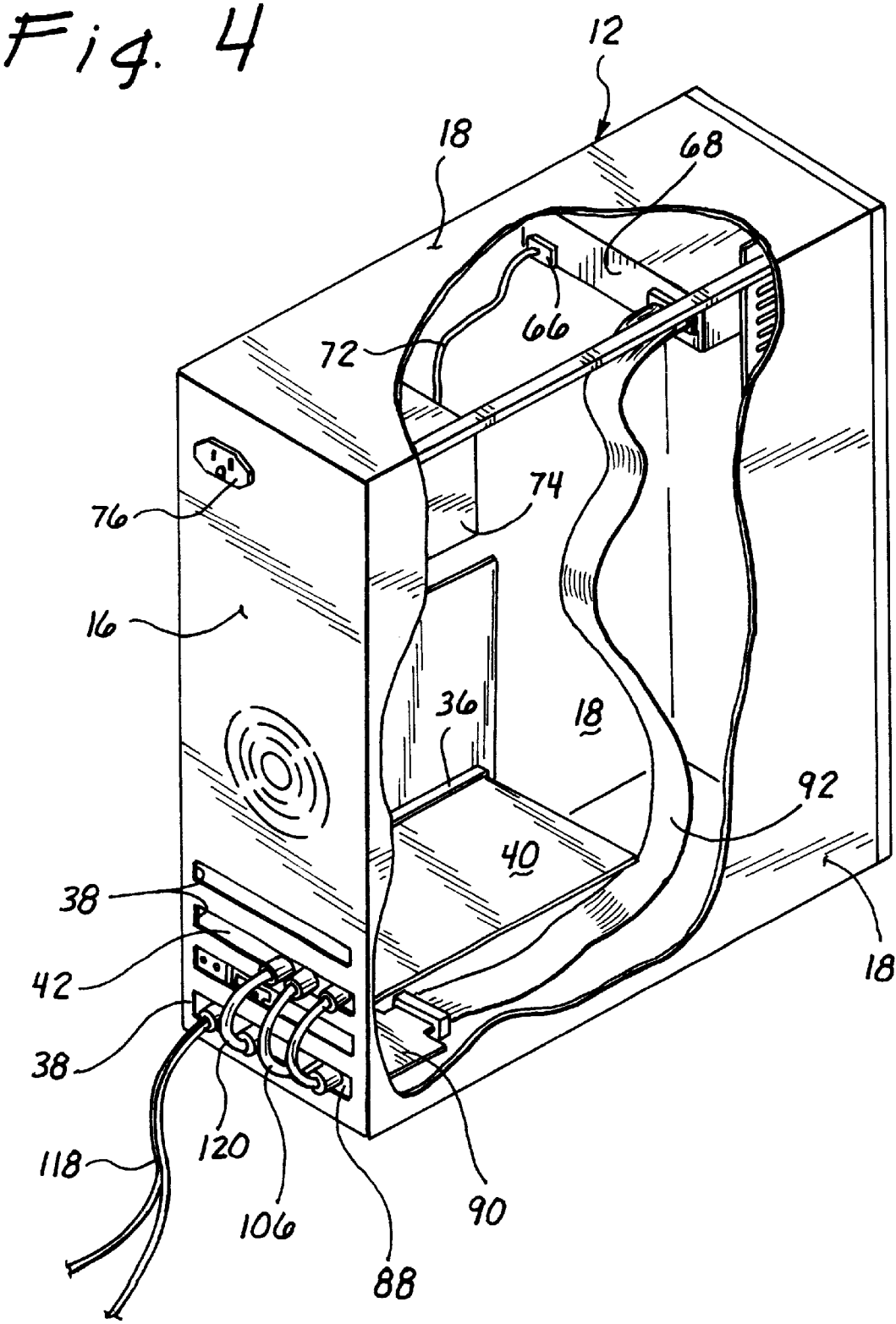
FIG. 4 is a rear side view of a typical computer case partially broken-away to show the interior interconnection between the installed graphic audio equalizer and the computer sound card, and the external connections between the rear connector of these components.

With reference to the drawings in which like elements are designated by like numerals, FIG. 1 shows a typical personal computer case 12 which has a front 14, a rear 16, seen in FIG. 4 and a number o sides 18. The case 12 has a number of drive bays 20, each of which opens at a front 14 of the computer case. The bays are interior spaces defined between two side plates 22 fastened to opposite sides 18 of the case. The bays are not partitioned from each other in a vertical direction, but each bay front panel is allotted a standard height of 1⅝ inches. The case 12 in FIG. 1 has four such bays. The lower most bay is closed by a removable front cover 24, and this bay may be empty, or may be occupied by a device such as a hard disk drive which does not require exterior access and is purely internal to the computer. The next drive bay is occupied by a CD-ROM drive 26, and the next bay above that houses a 5¼ inch floppy disk drive 28. The CD-ROM drive and floppy disk drive 26, 28, each have a front panel which is of standard height and width, the same dimensions as the front cover 24, namely, 5¾ inches wide by 1⅝ inches in height. Devices installed in each drive bay are supported in position by screws 32 inserted through slots 34 in the side plates 22. The depth of the drives bays is only limited by available space in the case 12, although most devices intended for drive bay installation are no more than about 8 inches in depth.

As depicted in FIG. 4, the PC case 12 houses a mother board 30 which carries the Central Processing Unit (CPU) or Microprocessor, a BIOS ROM, and RAM (Random Access Memory), along with various integrated circuits which are peripheral to the CPU. The mother board carries a number of slot connectors 36 which run from the rear 16 towards the front of the case. Each slot connector is aligned with a rear slot opening 38. A sound card 40 is installed in one slot connector 36, and has a number of external rear connectors on a bracket 42 which covers the corresponding slot 38 when the sound card is installed. The sound card connectors include a line out connector, a speaker out connector and a microphone input jack. Such sound cards are conventional and widely used in so called multi-media personal computer systems to enable the playback of digital sound files.

The present invention provides a graphic audio equalizer generally designated by numeral 50 in FIG. 1 which has an equalizer housing 52 sized and dimensioned for installation in a full size drive bay 20 in the computer case 12. The equalizer housing has a front panel 54 of standard height and width for mounting in a full size drive bay prompt opening 21 in FIG. 1. The front panel has eight vertically slidable level controls 56, each of which can slide within a vertical slot 58 above and below a neutral central position. Each level control 56 controls the audio level within a relatively narrow, typically an octave wide, portion of the entire audio spectrum. The audio equalizer 50 is called a graphic equalizer because the relative positions of the level control 56 on the front panel mate up a curve when viewed from left to right which actually represents the audio response of the equalizer across the entire audio spectrum. Depressed portions of this graph represent portions of the audio spectrum which are cut back in sound level relative to elevated portions of the graph. In other words the position of the slide controls graphically represents the shape of the equalizer output audio spectrum as selected by a user.

A master volume control 60 also provided in the front panel 54 controls the overall level of sound output from the equalizer, i.e, raises or lowers the volume across the entire audio spectrum without disturbing the relative levels set by the octave level control 56. Both the octave control 56 and master volume control 60 affect left and right sound channels of the stereo sound equalizer 50. Left and right LED bar displace show instantaneous sound level of the left and right sound channels, respectively.

The front panel 54 also features a headphone jack 64 into which can be inserted a standard headphone plug connected to a pair of audio headphones. The headphone jack 64 is connected and arranged internally to left and right audio amplifier outputs of the equalizer 50 such that, when a headphone plug is inserted in the headphone jack 64, audio output from the equalizer to the computer loud speakers is cut-off.

The equalizer is installed in the drive bay 21 by inserting the equalizer housing 52 through the front opening 21, and securing the housing in place by means of screws 32 inserted through slots 34 and into aligned threaded screw holes 35.

Electrical power is supplied to the audio equalizer 50 by means of an available power connector 66 plugged into a mating power connector on the rear 68 of the equalizer housing. The power connector 66 is connected by conductors 72 to the existing power supply 74 of the computer case. An AC power socket 76 on the rear of the case is connected to a conventional AC power outlet for powering the computer system.

Yet another feature of the equalizer 50 is a microphone input jack 78 which accepts a plug connected to a microphone, permitting the microphone input to be controlled through the equalizer 50 for output to the microphone input of the sound card 40, as will be explained below. A slide control 80, which may be a potentiometer, is connected as a volume control for adjusting the level of the microphone input, so that the equalizer microphone output can be conveniently controlled by manual adjustment on the front panel of the equalizer.

Thirdly, the equalizer 50 includes a built-in surround sound (SRS) audio processor for enhancing the audio output of the equalizer. The SRS system is selectively enabled or disabled by manual actuation of a SRS switch 82 mounted on the equalizer front panel 54.

The audio equalizer 50 may be further equipped with a Dolby noise reduction processor contained in housing 52 and selectively actuatable by means of a Dolby on/off switch 84 also on the front panel 54 for easy and convenient access at all times. Finally, an optional sound echo circuit may be included and a corresponding on/off echo switch 86 provided on the front panel 54.

For ease of installation, the graphic audio equalizer 50 includes a set of rear connectors mounted on a rear bracket 88 which is installed in one of the rear slot openings of the computer case 12, specifically in the lowermost slot 38 in FIG. 4. Such metal brackets are commonly used for supporting connectors at the rear slot openings of computer cases. A small printed circuit board 90 is supported on the bracket 88 and is connected via an edge connector to ribbon cable 92. The printed circuit board 90 carries an interface circuit, including a low level audio preamplifier which is supplied with power by the equalizer 50 via the ribbon cable 92. The other end of the ribbon cable plugs into a mating connector on the rear 68 of the equalizer housing 52 which in turn is connected to the appropriate inputs and outputs of the audio electronic circuits in the equalizer housing, so that the rear connectors on the bracket 88 and interface card 90 are appropriately connected.

Figure 3:
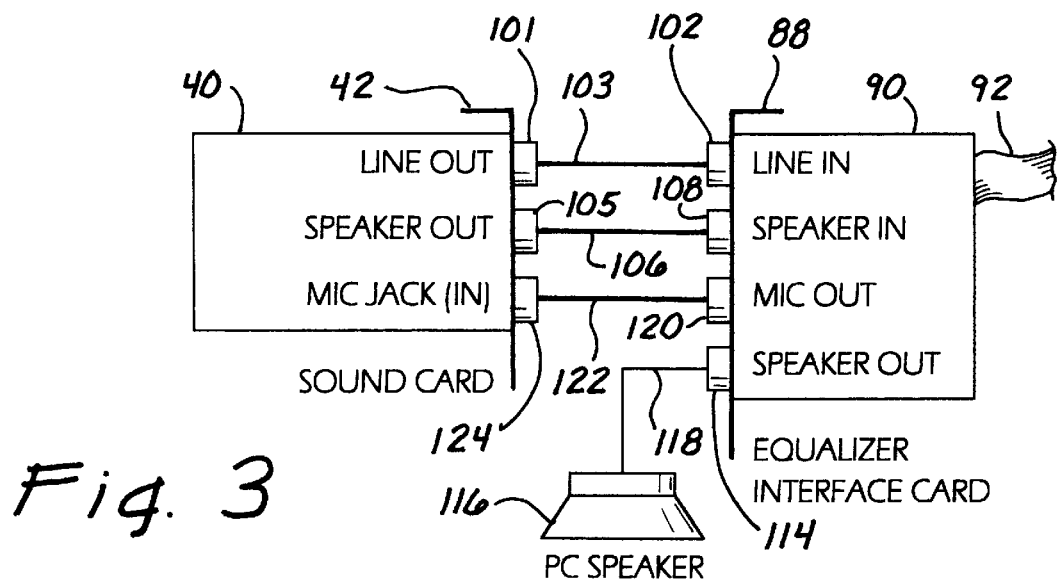
FIG. 3 is a block diagram illustrating the interconnection of the graphic audio equalizers interface card with a conventional personal computer sound card.

The bracket 88 carries four rear audio connectors of equalizer 50. These are line-in connector 102, speaker-in connector 108, microphone out connector 120 and speaker out connector 114. Three of these rear connectors are connected to corresponding rear connectors of the sound card 40 by means of cables installed as shown in FIGS. 3 and 4. The sound card 40 has line-out, speaker out and microphone input jacks or connectors on a bracket similar to bracket 88 but installed in an adjacent rear slot opening 38. The line-out connector 101 of the sound card is connected to the line-in connector 102 by audio cable 103, feeding low level audio output from the sound card to the interface card, where the low level audio signal is amplified prior to transmission along the ribbon cable 92. The speaker output 105 of the sound card, which provides a high level audio signal, is connected by cable 106 to the rear high input connector 108 of the equalizer.

Figure 5:
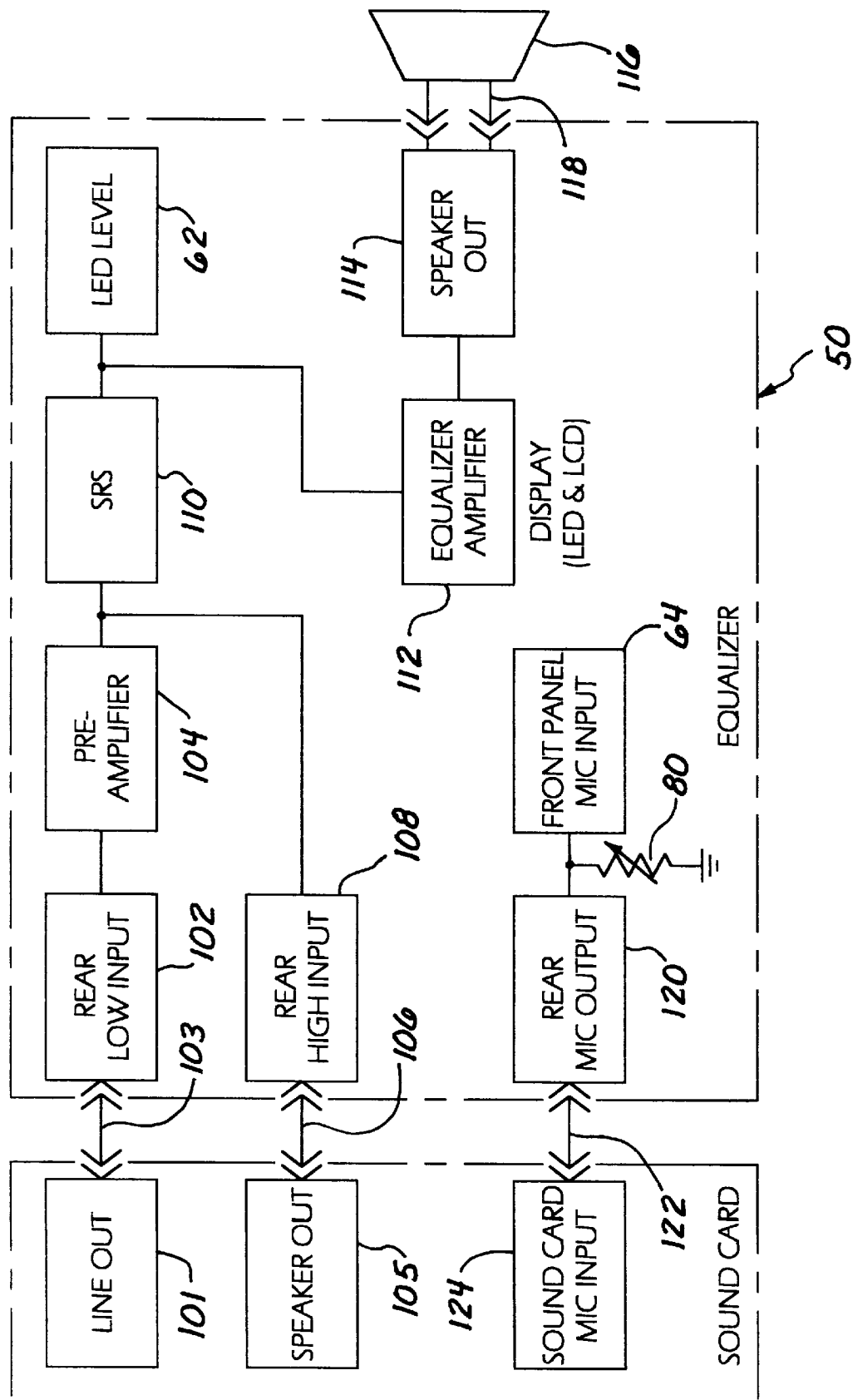
FIG. 5 is a block diagram of the audio equalizer circuits.

FIG. 5 illustrates in block diagram form the interconnection between the equalizer 50 and the sound card 40 at the rear of the computer case 12, and in particular illustrates the interconnections just described between the rear connectors of the graphic equalizer and the rear connectors of the sound card. Specifically, the rear low input 102 of the equalizer drives audio preamplifier 104 on interface card 90. Both the preamplifier input 104 and the rear height input 108 are connected to the input of surround sound (SRS) processor 110. The enhanced audio output of processor 110 is fed to the equalizer system controlled by the level controls 56 on the front panel 54, and then to a power amplifier, both labeled with numeral 112 in FIG. 5. The output of the surround sound processor 110 also drives the LED bar-graph displays 62. The high level audio output of the equalizer amplifier is connected via rear speaker out connector 114 to one or a pair of computer speakers 116, not shown in FIG. 4, by means of speaker cable 118.

The front panel microphone input jack 64 is connected to the microphone control 80, and the level-adjusted microphone input signal is delivered to the rear microphone output connector 120. Output connector 120 in turn is connected by cable 122 to the microphone input jack 124 of the sound card 40, as shown in FIGS. 3 through 5. The microphone input to the sound card is typically digitized for further processing or storage by the computer system. The equalizer 50 provides the front panel microphone input 64 and front panel mounted microphone volume control 80 as features of great convenience to the user of the computer system, who no longer needs to reach into the often inaccessible rear of the computer case 12, in order to plug in a microphone. Furthermore, the microphone volume can be easily manually controlled at the front panel, without having to bring up on screen a microphone level control which is typically part of the operating software of the computer sound card 40.

The audio processing circuits of the equalizer 50 contained in the housing 52 may be generally of conventional design, and need not be discussed in greater detail here. The improvement provided by this invention is one of packaging, interconnecting and interfacing a graphic audio equalizer for convenient use with a personal computer.

The audio equalizer 50 is preferably a stereo audio equalizer and includes two audio channels, i.e. left and right audio channels, each channel having separate amplifiers. In such case, all level and volume controls on the front panel are dual controls for simultaneously controlling both audio channels. Likewise, all input and output jacks and connectors are stereo jacks and connectors for receiving and delivering two channels of audio.

Figure 6:
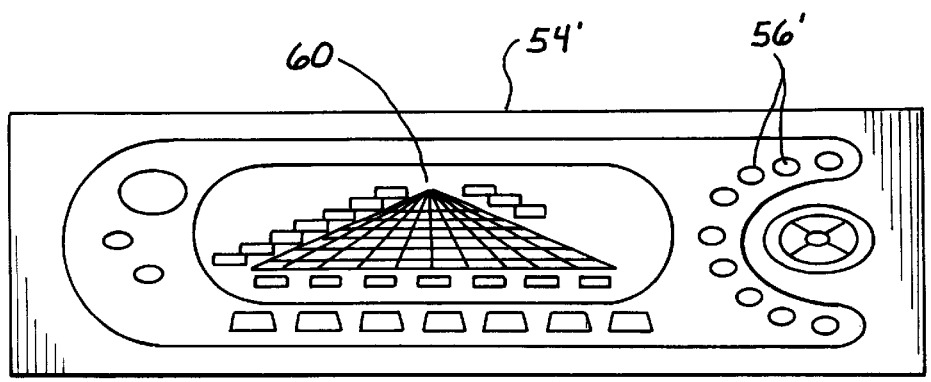
FIG. 6 is a front view of an alternate front panel of the graphic audio equalizer in which slide level controls of FIG. 2 have been replaced by a microprocessor control system with associated switches and graphic display on the front panel.

FIG. 6 illustrates an alternative configuration and implementation of the equalizer front panel 54'. It should be understood that the manually slidable level controls 56 on the front panel of FIG. 1 can be replaced by push button controls such as controls 56' in FIG. 6 which serve the same function via microprocessor control of an LCD or equivalent graphic display 60. In this alternative embodiment a graphic display of the shaped audio response of the equalizer is generated on a suitable electronic display by a display controller. Many available types of light emitting displays can be readily adapted for this purpose, including the aforementioned LCD (Liquid Crystal Display) display. Therefore this invention is not limited to any particular form of graphic display of the equalizer's shaped sound response nor to a particular means on the front panel for adjusting and controlling that shaped sound response.

From the foregoing it will be appreciated that the drive bay mounting, rear interconnection and other features disclosed above considerable operating convenience to those requiring a graphic equalizer as part of their multi-media personal computer systems. While a particular embodiment of the invention has been described and illustrated for purposes of clarity and example, it should be understood that many changes, substitutions and modifications to the described embodiment will be readily apparent to those having ordinary skill in this art without thereby departing from the scope and spirit of this invention which is defined by the following claims.

What is claimed is:

1. In a computer system comprising an enclosure having a front, a back and a plurality of sides, a mother board mounted in said enclosure, one or more disk drive bays in said enclosure each defining a bay opening in said front, a plurality of daughter card slots each having a slot opening in said back, a sound card mounted in one of said daughter card slots including a plurality of sound card connectors in a corresponding one of said slot openings, the improvement comprising:

a graphic audio equalizer having an equalizer enclosure including an equalizer front panel sized and configured for mounting in one of said drive bays with said front panel in said bay opening, manually operable controls on said front panel for shaping a desired audio response over an audio bandwidth of said equalizer, first visual indicator means on said front panel for displaying the shaped audio response, a master volume control manually adjustable for varying an overall audio output level of said equalizer, second visual indicator means for displaying an instantaneous audio level of said equalizer, a bracket mounted in another one of said card slots, a plurality of equalizer connectors including equalizer inputs and equalizer outputs on said bracket, a cable operatively interconnecting said equalizer connectors to said audio equalizer such that sound output from said sound card connectors may be connected to said equalizer inputs for deriving a shaped audio output at said equalizer outputs; and, an electric circuit card supported only on said bracket and carrying audio interface circuit means operative for amplifying low level audio input to said equalizer inputs, and wherein said cable is a ribbon cable means between said circuit card and said equalizer housing for supplying power to said card and carrying audio signals between said equalizer housing and said equalizer connectors on said bracket.

2. The computer system of claim 1 wherein said first visual indicator means comprise a plurality of manually movable level controls collectively displaying on said front panel the shape of said shaped sound response.

3. The computer system of claim 1 wherein said first visual indicator means comprise microprocessor driven graphic display means.

4. The computer system of claim 1 wherein said second visual indicator means comprise LED bar-graph display means.

5. The computer system of claim 1 wherein said equalizer further comprises a microphone jack on said front panel connected for feeding microphone audio to said microphone-out connector, and a manually operable volume control on said front panel operative for adjusting the level of said microphone audio fed to said microphone-out connector.

6. The computer system of claim 1 wherein said equalizer housing is dimensioned and configured to fit in a standard sized 5¼ inch hard drive bay in said enclosure.

7. The computer system of claim 1 wherein said equalizer front panel is substantially 5⅞ inches by 1¹¹⁄₁₆ inches in dimension.

8. The computer system of claim 3 wherein said first visual indicator means comprise a Liquid Crystal Display.

9. In a computer system comprising an enclosure having a front, a back and a plurality of sides, a mother board mounted in said enclosure, one or more disk drive bays in said enclosure each defining a bay opening in said front, a plurality of daughter card slots each having a slot opening in said back, a sound card mounted in one of said daughter card slots including a plurality of sound card connectors in a corresponding one of said slot openings, the improvement comprising:

a graphic audio equalizer having an equalizer enclosure including an equalizer front panel sized and configured for mounting in one of said drive bays with said front panel in said bay opening, manually operable controls on said front panel for shaping a desired audio response over an audio bandwidth of said equalizer, first visual indicator means on said front panel for displaying the shaped audio response, a master volume control manually adjustable for varying an overall audio output level of said equalizer, second visual indicator means for displaying an instantaneous audio level of said equalizer, a bracket mounted in another one of said card slots, a plurality of equalizer connectors including equalizer inputs and equalizer outputs on said bracket, a cable operatively interconnecting said equalizer connectors to said audio equalizer such that sound output from said sound card connectors may be connected to said equalizer inputs for deriving a shaped audio output at said equalizer outputs; and, an SRS audio system in said equalizer housing operative for enhancing sound delivered to said equalizer outputs and a manually actuatable on/off switch on said front panel connected for enabling or disabling said SRS audio system.

10. In a computer system comprising an enclosure having a front, a back and a plurality of sides, a mother board mounted in said enclosure, one or more disk drive bays in said enclosure each defining a bay opening in said front, a plurality of daughter card slots each having a slot opening in said back, a sound card mounted in one of said daughter card slots including a plurality of sound card connectors in a corresponding one of said slot openings, the improvement comprising:

a graphic audio equalizer having an equalizer enclosure dimensioned and configured to fit in a standard sized 5¼ inch hard drive bay in said enclosure including an equalizer front panel substantially 5⅞ inches wide by 1¹¹⁄₁₆ inches high for mounting in said bay opening, manually operable controls on said front panel for shaping a desired audio response over an audio bandwidth of said equalizer, first visual indicator means on said front panel for displaying the shaped audio response, a master volume control manually adjustable for varying an overall audio output level of said equalizer, second visual indicator means for displaying an instantaneous audio level of said equalizer, a headphone jack on said front panel connected for cutting off sound output to said equalizer outputs upon insertion of a headphone plug into the jack, said headphone jack being further connected such that audio derived from said headphone jack is adjustable by said master volume control, a bracket mounted in another one of said card slots, a plurality of equalizer connectors including a line-in connector, a speaker-in connector, a microphone-out connector and a speaker-out connector, a cable operatively interconnecting said equalizer connectors to said audio equalizer such that audio output from line-out or speaker-out connectors of said sound card connectors may be connected respectively to said line-in or speaker-in equalizer inputs for deriving a shaped audio output at said speaker-out connector of said equalizer, a microphone jack on said front panel connected for feeding microphone audio to said microphone-out connector, and a manually operable volume control on said front panel operative for adjusting the level of audio from said microphone sound input delivered to said microphone-out connector; and, an electronic circuit card supported only on said bracket and carrying audio interface circuit means operative for amplifying low level audio input from the said line-out connector of the sound card, said cable supplying power to said card.

11. The computer system of claim 10 wherein said first visual indicator means comprise a plurality of manually movable level controls collectively displaying on said front panel the shape of said shaped sound response.

12. The computer system of claim 10 wherein said first visual indicator means comprise microprocessor driven graphic display means.

13. The computer system of claim 12 wherein said first visual indicator means comprise a Liquid Crystal Display.

14. The computer system of claim 11 wherein said second visual indicator means comprise LED bar-graph display means.

* * * * *